United States Patent
Ren et al.

(10) Patent No.: US 11,091,078 B2
(45) Date of Patent: Aug. 17, 2021

(54) CLIP AND METHOD OF PRODUCING THE SAME

(71) Applicants: YKK Corporation, Tokyo (JP); YKK Corporation of America, Marietta, GA (US)

(72) Inventors: Zhiyu Ren, Macon, GA (US); Yuji Kirita, Kurobe (JP)

(73) Assignee: YKK Corporation

( * ) Notice: Subject to any disclaimer, the term of this patent is extended or adjusted under 35 U.S.C. 154(b) by 0 days.

(21) Appl. No.: 16/568,994

(22) Filed: Sep. 12, 2019

(65) Prior Publication Data

US 2021/0078473 A1    Mar. 18, 2021

(51) Int. Cl.
*B60N 2/58* (2006.01)
*B29C 44/12* (2006.01)
*B32B 3/00* (2006.01)

(52) U.S. Cl.
CPC ............ *B60N 2/5841* (2013.01); *B29C 44/12* (2013.01); *B60N 2/5825* (2013.01); *B32B 3/00* (2013.01); *Y10T 428/24008* (2015.01)

(58) Field of Classification Search
CPC ..... Y10T 428/24008; Y10T 428/24018; Y10T 428/24174; Y10T 24/45775; Y10T 428/24017; B60N 2/5841; B60N 2/5825
See application file for complete search history.

(56) References Cited

U.S. PATENT DOCUMENTS

| 7,517,577 | B2 | 4/2009 | Pedde et al. | |
| 2010/0117434 | A1* | 5/2010 | Galbreath | B60N 2/5825 297/452.58 |
| 2016/0280107 | A1* | 9/2016 | Sato | B60N 2/5891 |
| 2018/0256346 | A1* | 9/2018 | Byrd | A61F 2/389 |

* cited by examiner

*Primary Examiner* — Alexander S Thomas
(74) *Attorney, Agent, or Firm* — Kilpatrick Townsend & Stockton LLP (57) ABSTRACT

Clip includes a clip body provided with an accommodating space extending in a front-rear direction, and left and right wings coupled to the clip body in a left-right direction orthogonal to the front-rear direction. Each of the left and right wings includes front edge and rear edge which extend away from the clip body along the left-right direction. In one or both of the left and right wings, the front edge slants linearly or non-linearly forward of the clip as the front edge extends away from the clip body.

19 Claims, 10 Drawing Sheets

CLIP AND METHOD OF PRODUCING THE SAME

TECHNICAL FIELD

The present disclosure is related to a clip and a method of producing the same.

BACKGROUND

As disclosed in U.S. Pat. No. 7,517,577, a trim cover attachment device is known which includes a base and a female attachment portion.

In a case where a seat foam portion is provided with a clip for attaching a seat cover to the seat foam portion, the clip may be arranged to firmly lock the seat cover and thus it may be not easy to detach the seat cover from the clip. If a force is forcibly applied to detach the seat cover from the clip, the clip may be detached from the seat foam portion together with the seat cover. Based on such an aspect, the present inventors have newly identified a benefit of providing a clip that is capable of facilitating detachment of the seat cover while suppressing detachment of the clip. Note that the detachment of sear cover may be performed for various purposes such as replacement of seat cover from old to new or disappearance/removal of wrinkles on seat cover or modification of misalignment of seat cover. Such problems may be caused similarly in furniture such as sofa.

SUMMARY

A clip according to an aspect of the present disclosure may include:

a clip body provided with an accommodating space extending in a front-rear direction; and left and right wings coupled to the clip body in a left-right direction orthogonal to the front-rear direction, each of the left and right wings including front edge and rear edge which extend away from the clip body along the left-right direction, wherein in one or both of the left and right wings, the front edge slants linearly or non-linearly forward of the clip as the front edge extends away from the clip body.

In some embodiments, the front edges of both left and right wings may slant relative to the left-right direction.

In some embodiments, an angle between the left-right direction and the front edge may be equal to or less than 45°.

In some embodiments, at least one of the left and right wings may be provided with at least one cutout that extends toward the clip body along the left-right direction.

In some embodiments, front and rear arms may be arranged to sandwich the cutout, and the front arm slants forward of the clip as the front arm extends away from the clip body.

In some embodiments, the widths of the front and rear arms in the front-rear direction may be equal one another.

In some embodiments, each width of the left and right wings in the left-right direction may be greater than a width of the clip body in the left-right direction.

In some embodiments, each width of the left and right wings in the left-right direction may be greater than twice the width of the clip body in the left-right direction.

In some embodiments, the clip body may comprise:

left and right walls which define the accommodating space; and left and right nails which define an opening through which an attachment portion is introduced into the accommodating space, the left nail being coupled to the left wall and the right nail being coupled to the right wall, wherein at least one of the left and right nails has a curved surface at a front end of the clip body that widens a width of the opening in the left-right direction.

In some embodiments, the left and right walls extend in the up-down direction and have top and bottom ends in the up-down direction, the left and right wings being respectively coupled to the top or bottom ends of the left and right walls.

A method of producing a clip according to another aspect of the present disclosure may comprise:

producing a molded article through an extrusion molding, the molded article at least including: M (M indicates a natural number equal to or greater than 2) clip bodies each extending in an extruding direction; and N (N=M−1) intermediate portions each arranged between adjacent clip bodies in a width direction orthogonal to the extruding direction;

dividing the molded article at N first separation lines to obtain M individual pieces, the N first separation lines extending along the extruding direction and being set respectively in the N intermediate portions, and the first separation line being configured such that adjacent individual pieces have complementary shapes; and dividing the individual piece at second separation lines orthogonal to an elongated direction of the individual piece so that clips are obtained from the individual piece, the second separation line being configured such that the clips having the same shapes are obtained from the individual piece, wherein the clip comprises:

a clip body provided with an accommodating space extending in a front-rear direction that matches the extruding direction; and left and right wings coupled to the clip body in a left-right direction that matches the width direction, each of the left and right wings including front edge which extends away from the clip body along the left-right direction, wherein in one or both of the left and right wings, the front edge slants linearly or non-linearly forward of the clip as the front edge extends away from the clip body.

In some embodiments, at least one of the left and right wings is provided with at least one cutout that extends toward the clip body along the left-right direction.

In some embodiments, front and rear arms are arranged to sandwich the cutout, and the front and rear arms slant forward of the clip correspondingly as extending away from the clip body.

In some embodiments, the widths of the front and rear arms in the front-rear direction are equal.

BRIEF DESCRIPTION OF DRAWINGS

Embodiments and feature of the present disclosure will be described with reference to the attached drawings in which same elements are identified by same reference number.

DETAILED DESCRIPTION

Figure 1:
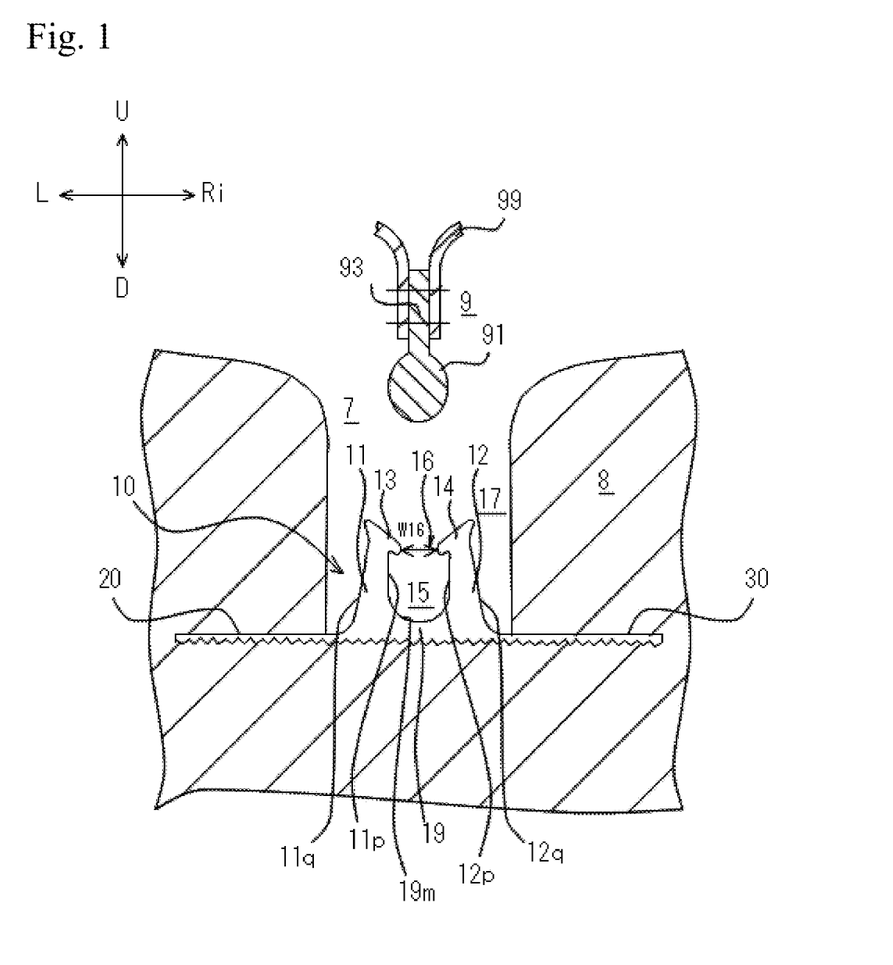
FIG. 1 is a schematic view showing how a seat cover is attached to a clip secured at a seat foam portion.

With reference to FIG. 1, a clip 10 is illustrated which is embedded into a seat foam portion 8. The foam portion 8 may be a portion of a seat of a moving body such as vehicle, airplane, train, ship or the like or may be a portion of a sofa which may be covered by a leather or the like. The surface of the foam portion 8 is covered and protected by a seat cover 99. The foam portion 8 may be a soft porous member and may be made of plastic foam, for example. The seat cover 99 may be a flexible sheet and may be a synthetic leather, natural leather, a fabric and the like, for example.

A plurality of clips 10 may be secured to the foam portion 8. The foam portion 8 may be molded through supplying foam material into a mold. When the foam portion 8 is molded, the clips 10 may be arranged at appropriate positions in the mold beforehand so that the clips 10 can be embedded in the foam portion 8. In the illustrated example, the clips 10 are arranged at the bottom of the groove 7, but should not be limited to this arrangement. For example, the clips 10 may be arranged at left or right sides of the groove 7 of the foam portion 8. The groove 7 formed in the foam portion 8 should not be limited to a vertically recessed groove, but may be a groove recessed in another direction.

Securing the clip 10 to the foam portion 8 may be done differently than the above manner. Embodiment is envisioned where the clip 10 is attached to a wire (not-illustrated) embedded in the foam portion 8. In particular, the clip 10 may be provided with a wire holding portion (not-illustrated), and the wire holding portion of the clip 10 may be coupled to a wire embedded in the foam portion 8, thereby the clip 10 can be firmly secured to the foam portion 8. A plurality of clips 10 may be intercoupled via a wire and detachment of the clips 10 off the foam portion 8 may be suppressed.

Attachment portion 9 which will be attached to the clip 10 is secured to the above-described seat cover 99 that is for covering the foam portion 8. The attachment portion 9 can be secured to the seat cover 99 variously including uses of adhesive agents or sewing or mechanical fits. The attachment portion 9 may have a cord 91 and an attachment plate 93, for example. The cord 91 may be shaped to have a round e.g. circle or oval cross-section and may extend in a front-rear direction (defined below). The cord 91 may be a cylindrical part and/or made of soft or hard material. The attachment plate 93 may be shaped to have a rectangular cross-section and may extend in the front-rear direction. The cord 91 will be accommodated and held in an accommodating space 15 of the clip 10 described below. The attachment plate 93 may be secured to the seat cover 99, e.g. sewn by yarn. The attachment portion 9 may be made of plastic e.g. polyurethane and/or may be elastic.

Figure 2:
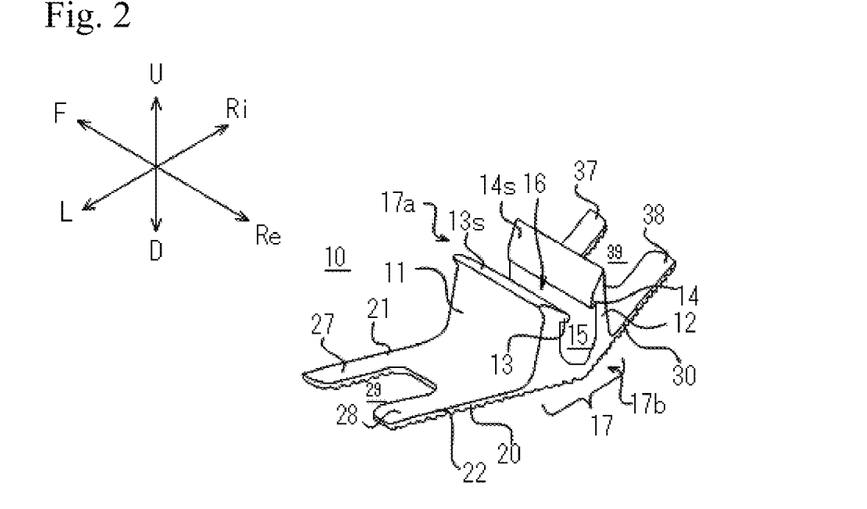
FIG. 2 is a schematic perspective view of a clip.
Figure 3:
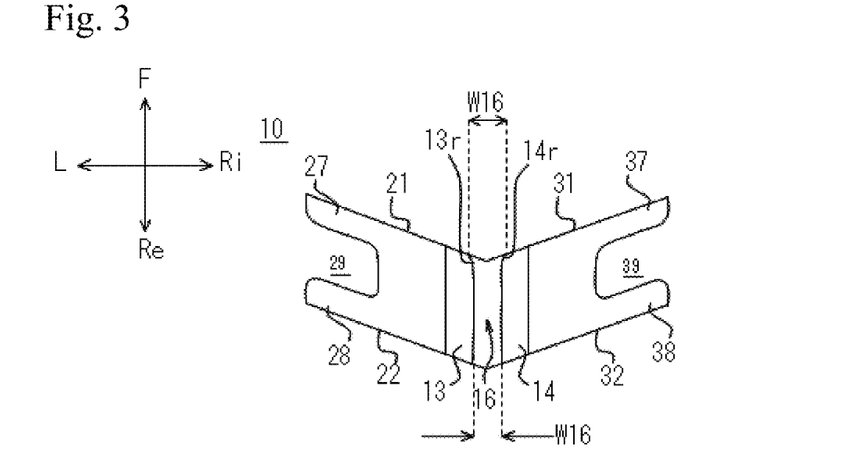
FIG. 3 is a schematic top view of a clip.

The clip 10 may be made of plastic material e.g. PET, PBT, PPC, ABS, PC-ABS or polyurethane. As shown in FIGS. 1-3, the clip 10 may have a clip body 17 provided with an accommodating space 15 extending in a front-rear direction; and left and right wings 20, 30 coupled to the clip body 17 in a left-right direction orthogonal to the front-rear direction. The clip 10 may be configured symmetrically relative to a center plane of the clip 10, but should not be limited to this configuration. The center plane extends in the front-rear direction and is positioned at the center of the clip 10 in the left-right direction.

The clip body 17 may be configured to hold the attachment portion 9. The left and right wings 20, 30 may be provided for the purpose of attaching the clip 10 to the foam portion 8. For example, a drag may be applied to the left and right wings 20, 30 when the clip 10 is moved off the foam portion 8 (i.e. the left and right wings 20, 30 serve as an anchor or stopper in the clip 10). Each of the left and right wings 20, 30 may be shaped like a plate but, of course, should not be limited to this shape.

The front-rear direction matches a direction the accommodating space 15 of the clip body 17 extends. Additionally or alternatively, the front-rear direction matches a direction the attachment portion 9 or the cord 91 extends. The left-right direction matches a direction the left and right wings 20, 30 extend from the clip body 17. Note that leftward indicates a direction the left wing 20 extends from the clip body 17, and rightward indicates a direction the right wing 30 extends from the clip body 17. Up-down direction is orthogonal to the front-rear and left-right directions.

In FIGS. 1 to 3 (particularly, in FIG. 2), the front-rear direction is identified by alphabets F, Re. Direction directed from Re to F indicates forward. Direction directed from F to Re indicates rearward. The left-right direction is identified by alphabets L, Ri. Direction directed from Ri to L indicates leftward. Direction directed from L to Ri indicates rightward. The up-down direction is identified by alphabets U, D. Direction directed from D to U indicates upward. Direction directed from U to D indicates downward.

The clip body 17 may have front and rear ends 17a and 17b in the front-rear direction. The accommodating space 15 has a front open end at the front end 17a of the clip body 17 and has a rear open end at the rear end 17b of the clip body 17. Furthermore, the accommodating space 15 is in spatial communication with an opening 16 positioned upward. The clip body 17 has left and right walls 11, 12 that are opposed to define the accommodating space 15, and left and right nails 13, 14 that are opposed to define the opening 16 through which the attachment portion 9 (e.g. the cord 91) is introduced into the accommodating space 15 and through which the attachment portion 9 (e.g. the cord 91) is moved out of the accommodating space 15. The left nail 13 is coupled to the left wall 11 and the right nail 14 is coupled to the right wall 12. The opening 16 may serve as inlet and outlet for the attachment portion 9.

Each of the left and right walls 11, 12 extends in the up-down direction. The left wall 11 extends upward from a right end of the left wing 20. The right wall 12 extends upward from a left end of the right wing 30. The left and right nails 13, 14 are provided at the top ends of the left and right walls 11, 12 respectively. The left and right walls 11, 12 are coupled to form a bottom portion 19 directly beneath the opening 16 between the left and right nails 13, 14.

The left wall 11 has an inner surface 11p facing the right wall 12 and an outer surface 11q opposite to the inner surface 11p. The right wall 12 has an inner surface 12p facing the left wall 11 and an outer surface 12q opposite to the inner surface 12p. The inner surface 11p, 12p extend in parallel along the up-down direction and are coupled to a bottom surface 19m of the bottom portion 19. The outer surface 11q, 12q are arranged to slant relative to the up-down direction. Each thickness of the left and right walls 11, 12 in the left-right direction decreases gradually from the bottom end to the top end thereof. Distance between the inner surface 11p and the outer surface 11q increases as the surfaces 11p, 11q extend away from the left nail 13. Likewise, the distance between the inner surface 12p and the outer surface 12q increases as the surfaces 12p, 12q extend away from the right nail 14.

The nails 13, 14 are provided with guide surfaces 13s, 14s which are sloped inwardly downwardly and form a tapered surface having an interspace (in the left-right direction) that narrows downward. The guide surfaces 13s, 14s of the nails 13, 14 may guide the cord 91 to smoothly enter into the opening 16. Direction of inward may indicate a direction directed to the center plane located between the left and right walls 11, 12 or left and right nails 13, 14. Direction of outward may indicate an opposite direction of the inward.

The left and right nails 13, 14 each may have a locking portion inwardly protruded from the inner surface 11p, 12p and/or an extended portion outwardly protruded from the outer surface 11q, 12q. The locking portion of each left and right nails 13, 14 may be configured to lock the cord 91 when the cord 91 has been accommodated in the accommodating space 15. The locking portion of each left and right nails 13, 14 may be arranged above the bottom surface 19m of the bottom portion 19. When the cord 91 is placed on the bottom surface 19m of the bottom portion 19, the cord 91 is sandwiched between the left and right walls 11, 12 and between the bottom surface 19m and the left and right nails 13, 14 (e.g. the locking portions of the left and right nails 13, 14). The extended portion of each left and right nails 13, 14 may provide an extended guide surface for the cord 91. In other words, the guide surface 13s, 14s of the nail 13, 14 is outwardly extended in accordance with the extended portion of the nail 13, 14.

When the cord 91 is pressed into the opening 16 between the left and right nails 13, 14, the guide surfaces 13s, 14s of the left and right nails 13, 14 are pushed in the opposite direction along the left-right direction, and the left and right walls 11, 12 are tilted in the opposite direction along the left-right direction. The cord 91 can enter into the accommodating space 15 of the clip body 17 through the widened opening 16 the left-right direction. The bottom ends of the left and right nails 13, 14 are arranged above the cord 91 having been accommodated in the accommodating space 15 of the clip body 17, preventing detachment of the cord 91 from the accommodating space 15. Note that, when the cord 91 is accommodated in the accommodating space 15, the attachment plate 93 is interposed between the left and right nails 13, 14.

Widths or maximum widths of the respective left and right walls 11, 12 in the front-rear direction are equal. Width or maximum widths of the respective left and right nails 13, 14 in the front-rear direction are equal. The left and right nails 13, 14 each has a curved surface 13r, 14r at the front end 17a of the clip body 17 (see FIG. 3), widening the width W16 of the opening 16 in the left-right direction. Accordingly, the cord 91 can be more easily detached from the clip 10. An embodiment is envisioned where the left and right walls 11, 12 each has a curved surface at the front end 17a of the clip body 17. The curved surface of each wall 11, 12 and the curved surface 13r, 14r of each nail 13, 14 may form a continuous curved surface. Note that, this curved surface can be formed by partially polishing or cutting the clip 10 e.g. the front end 17a of the clip body 17. Similarly, an embodiment is envisioned where one or each of left and right nails 13, 14 has a curved surface 13r, 14r at the rear end 17b of the clip body 17.

The left wing 20 has a front edge 21 and a rear edge 22 which extend leftward from the clip body 17. Likewise, the right wing 30 has a front edge 31 and a rear edge 32 which extend rightward from the clip body 17. Each front edge 21, 31 slants relative to the left-right direction, not necessarily limited to this though. Likewise, each rear edge 22, 32 slants relative to the left-right direction. Acute angle between the left-right direction and the front edge 21, 31 may be equal to or less than 45° or 35° or 25° or 20°. Acute angle between the left-right direction and the front edge 21, 31 may be equal to or greater than 10° or 15°. Acute angle between the left-right direction and the rear edge 22, 32 may be equal to or less than 45° or 35° or 25° or 20°. Acute angle between the left-right direction and the rear edge 22, 32 may be equal to or greater than 10° or 15°. Angle between the left-right direction and the front edge 21 and angle between the left-right direction and the front edge 31 may be equal or different. Angle between the left-right direction and the rear edge 22 and angle between the left-right direction and the rear edge 32 are equal or different. Angle between the front edge 21 (or an extension line thereof) and the front edge 31 (or an extension line thereof) may be less than 180°, e.g. between 120° to 170°, preferably between 140° to 160°, and more preferably between 145° to 155°. In some embodiments in which the angle between the front edge 21 (or an extension line thereof) and the front edge 31 (or an extension line thereof) is between 145° to 155°, a total reaction force applied to front arms 27, 37 (described below) and rear arms 28, 38 (described below) from the cord 91 (e.g. made of polyurethane) may be maximized when the attachment portion 9 is pulled up so as to be detached at forward position of the front end 17a or at rearward position of the rear end 17b.

The left wing 20 is provided with at least one cutout 29 that extends rightward toward the clip body 17. Likewise, the right wing 30 is provided with at least one cutout 39 that extends leftward toward the clip body 17. The left wing 20 includes front and rear arms 27, 28 arranged to sandwich the cutout 29. The front arm 27 slants forward of the clip 10 as extending away from the clip body 17. In particular, the front and rear arms 27, 28 correspondingly slant forward of the clip 10 as extending away from the clip body 17. Likewise, the right wing 30 includes front and rear arms 37, 38 which are arranged to sandwich the cutout 39. The front arm 37 slants forward of the clip 10 as extending away from the clip body 17. In particular, the front and rear arms 37, 38 correspondingly slant forward of the clip 10 as extending away from the clip body 17.

Widths of the respective front and rear arms 27, 28 in the front-rear direction are equal, not necessarily limited to this though. Likewise, widths of the front and rear arms 37, 38 in the front-rear direction are equal. The width of the cutout 29 in the front-rear direction is substantially constant in the left-right direction, but should not be limited to this. The same applies to the cutout 39.

Optionally, an arrangement of grooves may be formed in one or both of bottom surfaces of the left and right wings 20, 30 (See FIGS. 1 and 2). The groove may extend linearly e.g. along the front-rear direction, but should not be limited to this configuration. The grooves at the bottom surface of the wing 20, 30 increases contact area between the wing 20, 30 and the foam portion 8, preventing displacement of the wing 20, 30 relative to the foam portion 8.

Figure 4:
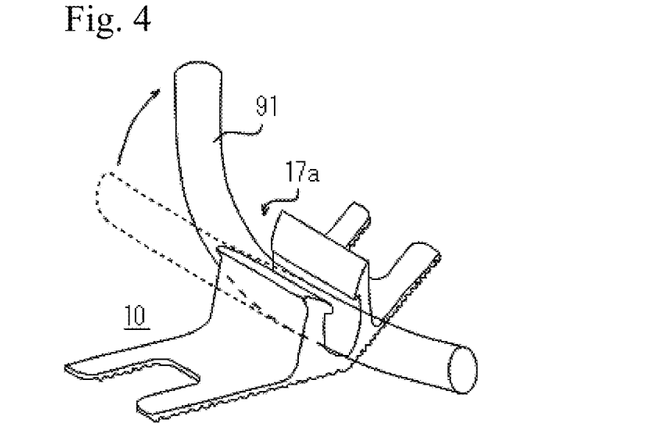
FIG. 4 is a schematic view showing how an attachment portion is detached from a clip.

As shown in FIG. 4, when the attachment portion 9 (e.g. the cord 91) or the seat cover 99 to which the attachment portion 9 is secured is pulled upward at a forward position of the front end 17a of the clip body 17, not only the attachment portion 9 is detached from the clip 10 but also the clip 10 can be detached from the foam portion 8. Note that the left and right nails 13, 14 are pushed upward at the front end 17a of the clip body 17 (i.e. at the front end of the respective nails 13, 14).

The left and right wings 20, 30 extend away from the clip body 17 in the left-right direction so that sufficient contact area with the foam portion 8 is ensured. Therefore, the clip 10 can resist at the left and right wings 20, 30 against the upward force. Thus, while suppressing detachment of the clip 10 from the foam portion 8, detachment of the attachment portion 9 from the clip 10 would be facilitated.

In some cases, each width (e.g. maximum width) of the left and right wings 20, 30 in the left-right direction is greater than the width of the clip body 17 in the left-right direction. Depending on cases, each width (e.g. maximum width) of the left and right wings 20, 30 in the left-right direction is greater than twice the width of the clip body 17 in the left-right direction. Accordingly, the clip 10 can resist at the left and right wings 20, 30 more sufficiently against the upward pulling force.

Figure 5:
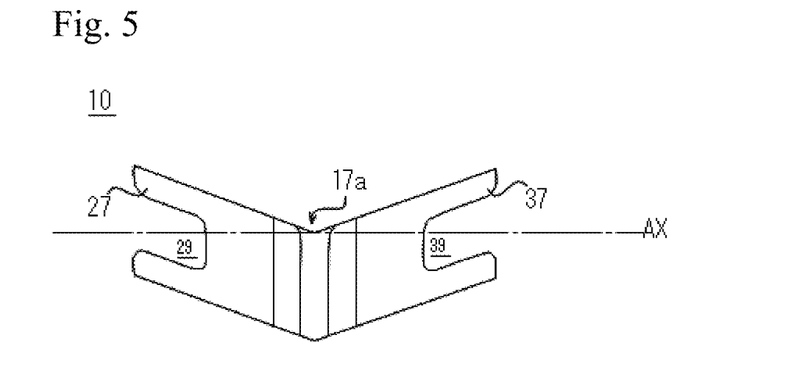
FIG. 5 is a schematic top view of a clip referred together with FIG. 4.

In the present embodiment, in one or both of the left and right wings 20, 30, the front edge 21, 31 slants linearly or non-linearly forward of the clip 10 as the front edge 21, 31 extends away from the clip body 17. This increases the contact area of the left and right wings 20, 30 with the foam portion 8 in a front region located at the front side of the axis AX extending in parallel with the left and right direction shown in FIG. 5 and the clip 10 can resist against the above-described upward pulling force. As a result, while suppressing detachment of the clip 10 from the foam portion 8, stable or easier detachment of the attachment portion 9 from the clip 10 would be facilitated. Note that the front edge 21, 31 may extend non-linearly such as meandering, zigzag, or any other manners.

In some cases such as shown in FIG. 3, the left and right nails 13, 14 are provided with the curved surfaces 13r, 14r at the front end 17a of the clip body 17, the attachment portion 9 may be more easily detached from the clip 10.

In some embodiments, the clip 10 may be configured to give a directionality along the front-rear direction for the detachment of the attachment portion 9 from the clip 10. That is, the clip 10 may be adapted for pulling the attachment portion 9 upward at the front side of the clip 10 as shown in FIG. 4, and may NOT be adapted for pulling the attachment portion 9 upward at the rear side of the clip 10 (it may be possible to pull the attachment portion 9 up at the rear side of the clip 10 though).

Figure 6:
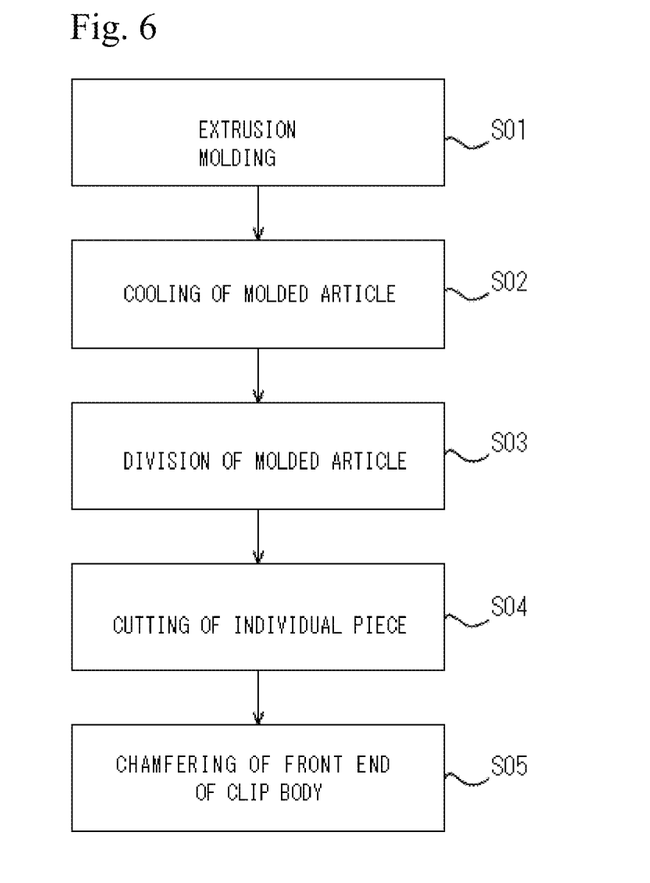
FIG. 6 is a schematic flowchart showing a process of producing clips.
Figure 7:
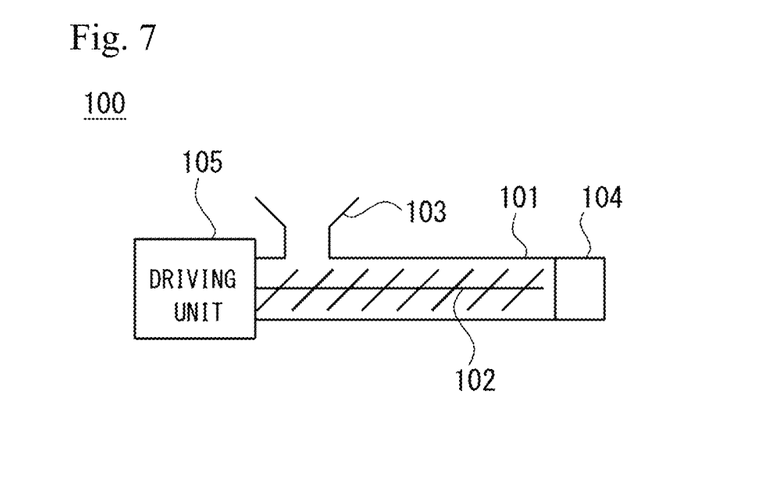
FIG. 7 is a schematic view showing schematic configuration of an extrusion molding apparatus.
Figure 8:
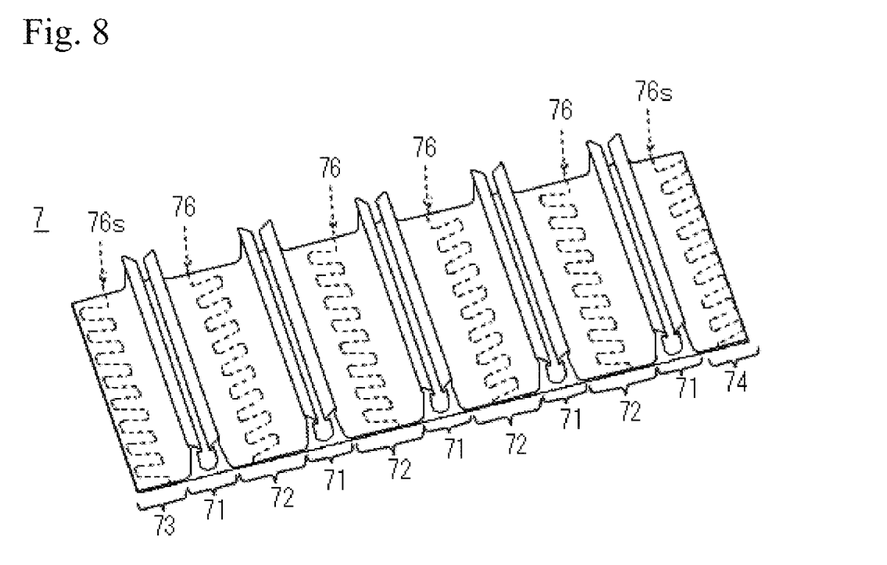
FIG. 8 is a schematic perspective view of a molded article.
Figure 9:
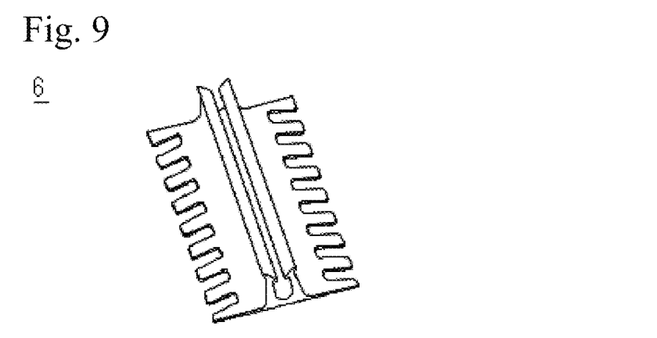
FIG. 9 is a schematic perspective view of an individual piece obtained from a molded article.
Figure 10:
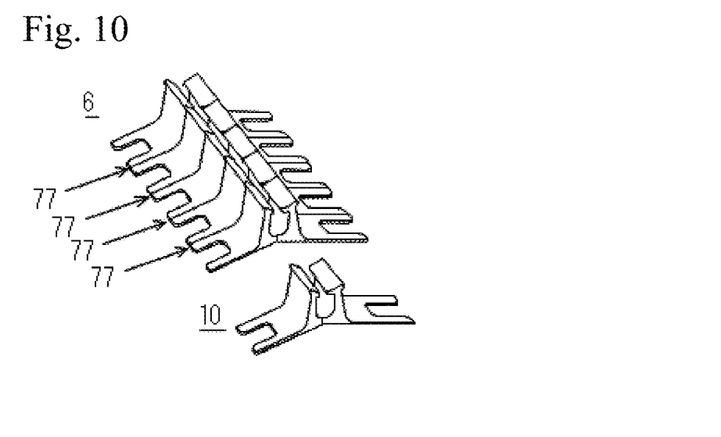
FIG. 10 is a schematic view showing that clips are obtained by cutting an individual piece.

In some embodiments, the clip 10 is shaped so as to be adapted for mass production. This non-limiting feature will be described with reference to FIGS. 6-10. FIG. 6 is a schematic flowchart showing a process of producing clips 10. FIG. 7 is a schematic view showing schematic configuration of an extrusion molding apparatus 100. FIG. 8 is a schematic perspective view of a molded article 7. FIG. 9 is a schematic perspective view of an individual piece 6 obtained from a molded article 7. FIG. 10 is a schematic view showing that clips 10 are obtained by cutting an individual piece 6.

As shown in FIG. 6, in a process of producing the clips 10, a molded article 7 is firstly produced through extrusion molding (S01). For the extrusion molding, an extrusion molding apparatus 100 such as shown in FIG. 7 can be used. The extrusion molding apparatus 100 has a cylinder 101, screw 102, hopper 103, mold 104, and a driving unit 105. The screw 102 is rotated by the driving unit 105. Resin material supplied from the hopper 103 may be heated in the cylinder 101 and transferred downstream in the cylinder 101. Melted resin is extruded through the mold 104 so that a molded article 7 such as shown in FIG. 8 is produced. Following or at the same as the extrusion molding, the molded article 7 may be cooled (S02). Various cooling methods can be adopted such as water-cooling or air-cooling or the like.

As shown in FIG. 8, the molded article 7 at least includes: M (M indicates a natural number equal to or greater than 2) clip bodies 71 each extending in an extruding direction; and N (N=M−1) intermediate portions 72 each arranged between adjacent clip bodies 71 in a width direction orthogonal to the extruding direction. In the following descriptions, the extruding direction matches the front-rear direction and the width direction matches the left-right direction.

In a case shown in FIG. 8, the molded article 7 has five clip bodies 17 and four intermediate portions 72. One clip body 71 included in the molded article 7 may be a continuation of clip bodies 17 obtained from said one clip bodies 71. In other words, the clip body 71 includes or consists of continuously arranged or coupled clip bodies 17 of a first subset of the total clips 10 obtained from the molded article 7. In the molded article 7, each clip body 71 extends in the front-rear direction. In the molded article 7, the clip bodies 71 are arranged by equal interval in the left-right direction. Left end portion 73 of the molded article 7 is coupled to the leftward-most clip body 17, and right end portion 74 of the molded article 7 is coupled to the rightward-most clip body 17. The intermediate portion 72, the left end portion 73, and the right end portion 74 have the same thickness, but should not be limited to this.

Next, the molded article 7 is divided (S03) and individual pieces 6 shown in FIG. 9 are obtained. In particular, the molded article 7 is divided at or along N first separation lines 76 (See FIG. 8) extending in the extruding direction and respectively set in the N intermediate portions 72, resulting in the M individual pieces 6. Advantageously, the first separation line 76 may be configured such that adjacent individual pieces 6 have complementary shapes. Note that the molded article 7 may be cut along separation lines 76s at the left and right end portions 73, 74 of the molded article 7 in order to reduce a loss of row material.

Next, cutting of the individual piece 6 is performed (S04) so that clips 10 are cut out from the individual piece 6 as shown in FIG. 10. In particular, each individual piece 6 is cut at second separation lines 77 (See FIG. 10) so that each piece 6 is obtained from the molded article 7. A plurality of clips 10 is obtained from each individual piece 6. The second separation line 77 is orthogonal to a direction the individual piece 6 extends. The second separation lines 77 may be configured such that the clips 10 having the same shapes are obtained from the individual piece 6. Any shearing or cutting machine can be used for cutting the individual pieces 6.

Next, optionally, the front end 17a of the clip body 17 may be chamfered (S05). For example, the left and right nails 13, 14 are chamfered e.g. by using grinding or polishing so that the curved surfaces 13r, 14r are formed at the front end 17a of the clip body 17, e.g. at the front end of the nails 13, 14. This facilitates easier detachment of the cord 91 from the clip body 17. The left and right walls 11, 12 may be chamfered e.g. by using grinding or polishing so as to have the curved surfaces at the front end 17a of the clip body 17, e.g. at the front end of the walls 11, 12. Any grinding or polishing machine for partial grinding or polishing of the clip 10 may be used. Note that, chamfering can be done through any ways such as cutting and the like, and should not be limited to grinding.

As would be understood from the above descriptions, a plurality of individual pieces 6 is obtained from the molded article 7, and a plurality of clips 10 is obtained from each individual piece 6. As the individual pieces 6 have complementary shapes, the clips 10 obtained from the individual pieces 6 can have the same shapes.

Another embodiment will be described with reference to FIGS. 11 to 15. As would be understood from FIGS. 11 to 15, it would be possible that left and right wings 20, 30 are not coupled to the bottom ends of the clip body 17 (e.g. the bottom ends of the left and right walls 11, 12) but are coupled to the top ends of the clip body 17 (e.g. the top ends of the left and right walls 11, 12). The top surface of the clip 10 may be flat when the clip 10 is secured to the foam portion 8, possibly suppressing physical stimulus otherwise given to a driver who sits on a driver's seat as a matter of possibility.

Figure 11:
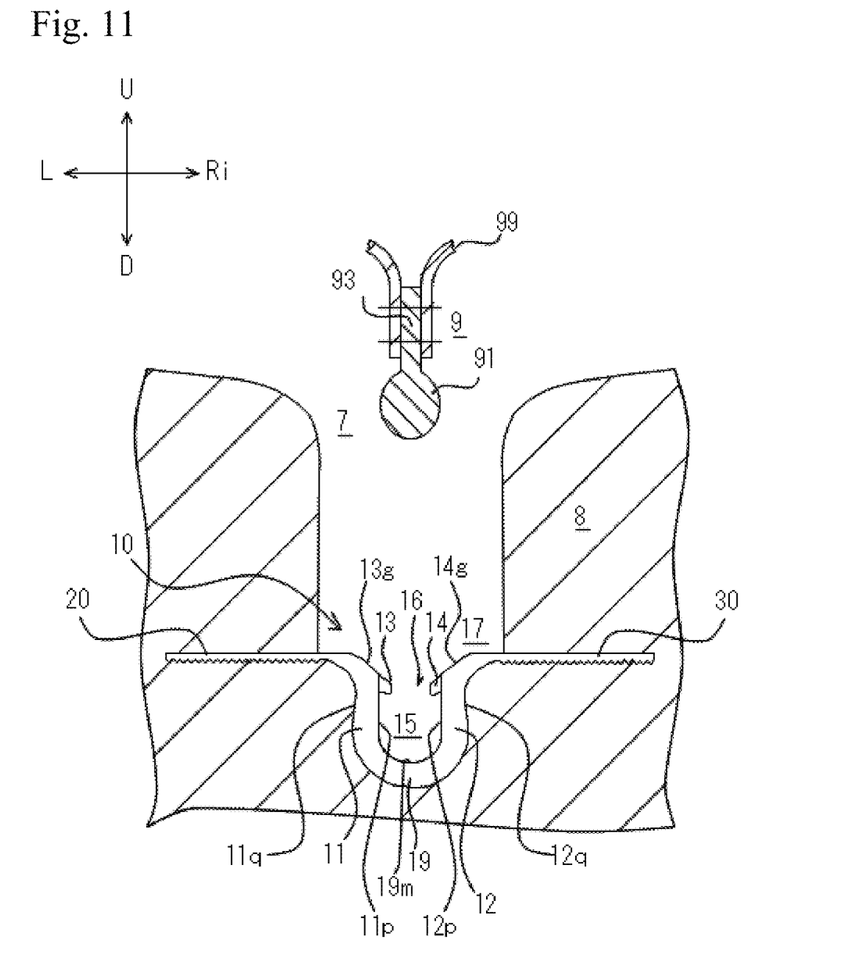
FIG. 11 is a view showing that a seat cover is attached to another clip secured at a seat foam portion.
Figure 12:
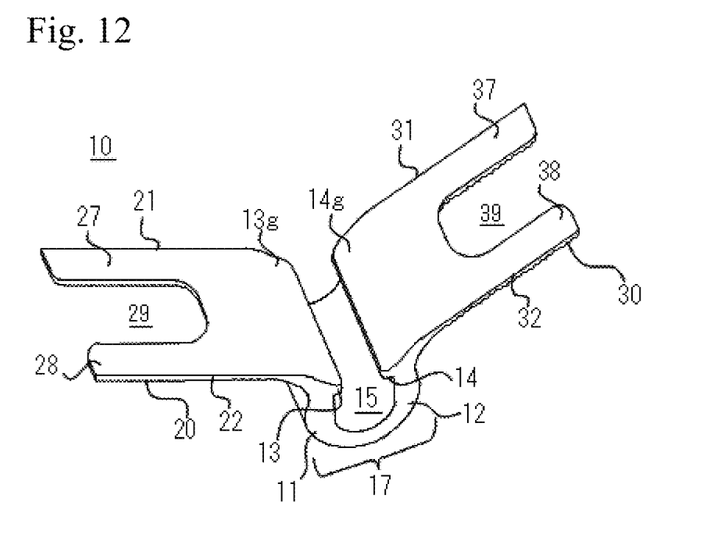
FIG. 12 is a schematic perspective view of another clip.
Figure 13:
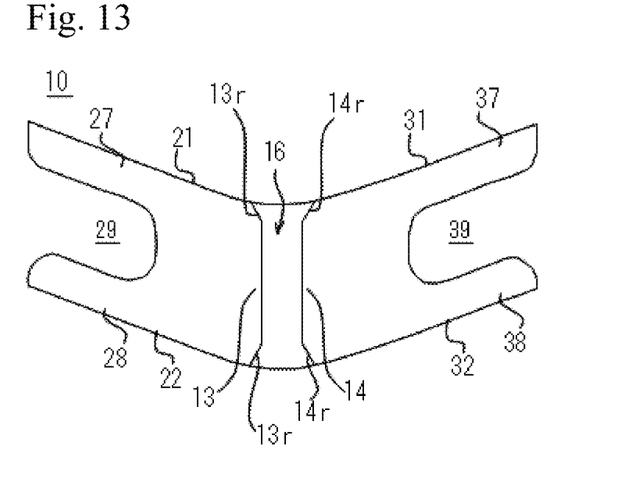
FIG. 13 is a schematic top view of another clip.
Figure 14:
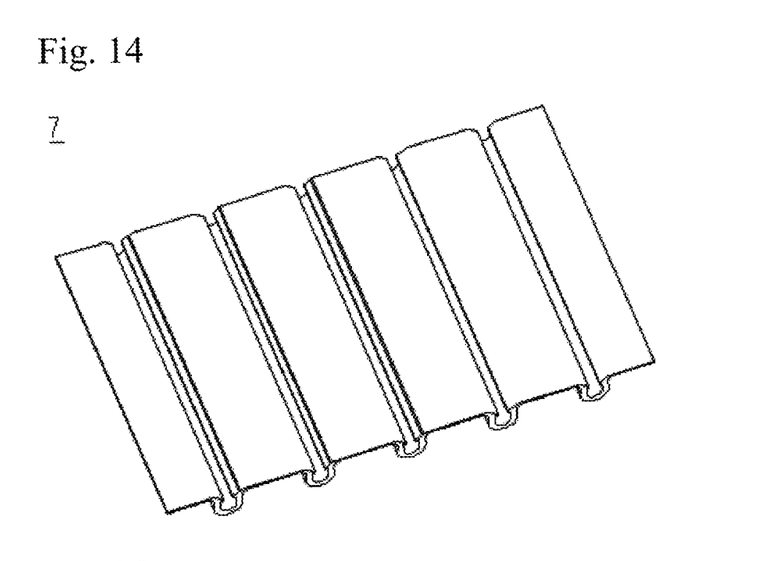
FIG. 14 is a schematic perspective view of another molded article.
Figure 15:
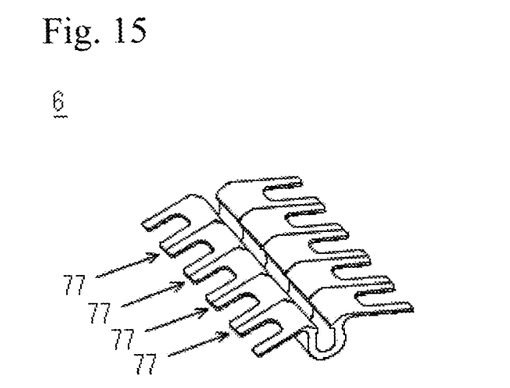
FIG. 15 is a schematic perspective view of another individual piece obtained from another molded article.
Figure 16:
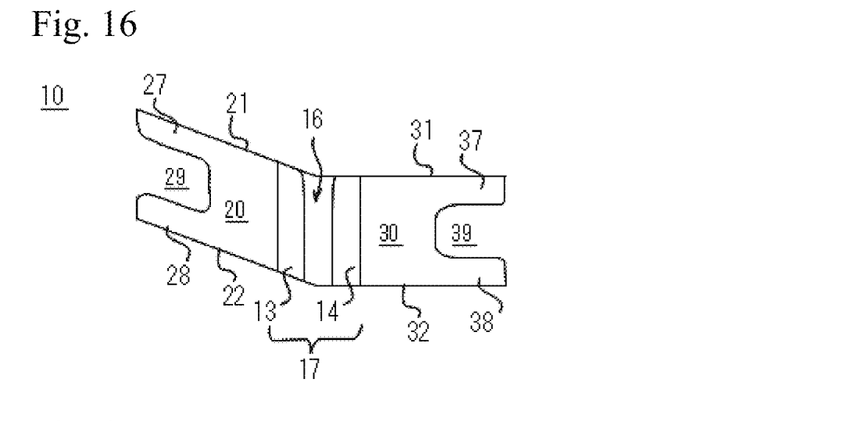
FIG. 16 is a schematic top view of a clip according to a modified example.

As shown in FIGS. 11 to 13, the left wall 11 extends downward from the right end of the left wing 20. The right wall 12 extends downward from the left end of the right wing 30. The left and right walls 11, 12 are coupled to form the bottom portion 19 directly underneath the opening 16 between the left and right nails 13, 14. According to such configuration of the walls 11, 12, the clip body 17 is U-shaped.

The left and right nails 13, 14 are protruded from the inner surfaces 11p, 12p and are positioned above the bottom surface 19m of the bottom portion 19. Guide surfaces 13g, 14g are sloped inwardly downwardly and formed across the top surfaces of the left or right wing 20 and the left or right nail 13. The guide surfaces 13g, 14g form a tapered surface having a width in the left-right direction that narrows downward. When the cord 91 is pressed into the opening 16 between the left and right nails 13, 14, the cord 91 touches and pushes the guide surfaces 13g, 14g, and the left and right walls 11, 12 are pushed in the opposite direction along the left-right direction, thus increasing the width of the opening 16 in the left-right direction between the nails 13, 14. The cord 91 can then enter into the accommodating space 15 via the opening 16 between the nails 13, 14.

The left and/or right nail 13, 14 may have a curved surface 13r, 14r at the front or rear end 17b, 17b of the clip body 17 i.e. at the front or rear end of the nails 13, 14 (See FIG. 13) so that the width W16 of the opening 16 in the left-right direction will be widened. Accordingly, the cord 91 may be more easily detached from the clip 10. Embodiments are envisioned where the left and right walls 11, 12 have curbed surfaces at the front end 17a of the clip body 17. The curved surface of the wall 11, 12 and the curved surface 13r, 14r of the nail 13, 14 may form a continuous curved surface.

The clip 10 shown in FIGS. 11 to 13 is shaped so as to be adapted for mass production, likewise the clip 10 shown in FIGS. 1 to 3. Molded article 7 shown in FIG. 14 corresponds to the molded article 7 shown in FIG. 8. Individual piece 6 shown in FIG. 15 corresponds to the individual piece 6 shown in FIG. 9. Clip 10 shown in FIGS. 11 to 13 can be produced in the same way as the clip 10 shown in FIGS. 1 to 3 are produced.

Modified example will be discussed with reference to FIGS. 16 to 19. As would be understood from FIG. 16, envisioned is that one of the left and right wings 20, 30 is arranged in parallel to the left-right direction. In the illustrated example, the front and rear edges 31, 32 of the right wing 30 extend in parallel to the left-right direction. Similarly, the front and rear arms 37 and 38 extend in parallel to the left-right direction.

Figure 17:
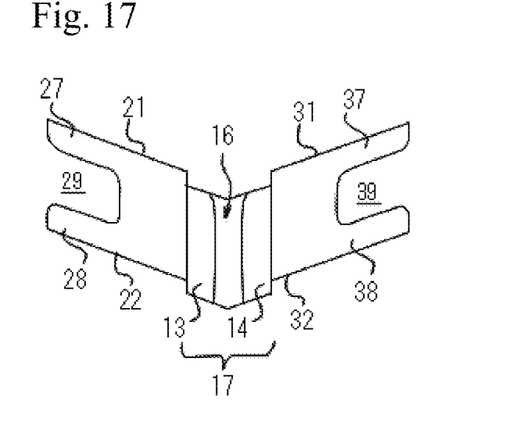
FIG. 17 is a schematic top view of a clip according to a modified example.
Figure 18:
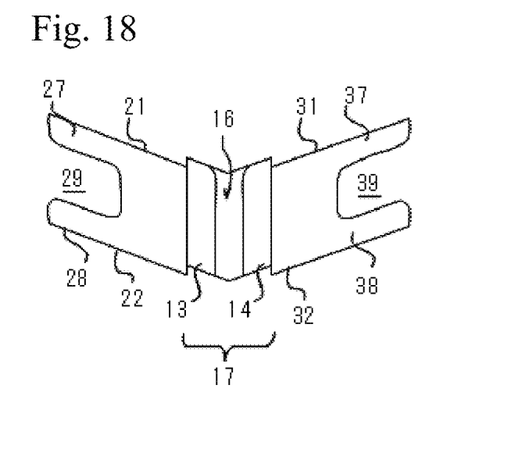
FIG. 18 is a schematic top view of a clip according to a modified example.

As shown in FIG. 17, envisioned is that the left and right wings 20, 30 are positioned offset forward relative to the clip body 17. Contact area between the wing 20, 30 with the foam portion 8 at the front side of the front end 17a of the clip body 17 may be increased. As shown in FIG. 18, envisioned is that the clip body 17 is positioned offset forward relative to the left and right wings 20, 30.

Figure 19:
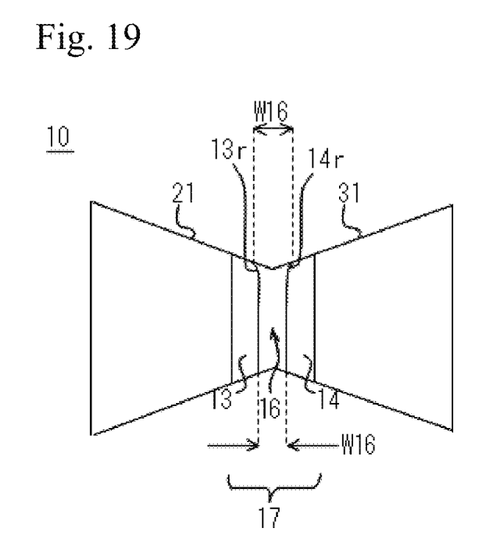
FIG. 19 is a schematic top view of a clip according to a modified example.

As shown in FIG. 19, an embodiment is envisioned where the wing 20, 30 has a width in the front-rear direction that increases as the wing 20, 30 extends away from the clip body 17. In particular, the front edge 21, 31 slants linearly or non-linearly forward of the clip 10 as the front edge 21, 31 extends away from the clip body 17, and the rear edge 22, 32 slants linearly or non-linearly toward the rear side of the clip 10 as the rear edge 22, 32 extends away from the clip body 17. In this embodiment, the clip 10 is not configured to give a directionality along the front-rear direction for the detachment of the attachment portion 9 from the clip 10. The clip 10 is adapted for pulling the attachment portion 9 up at the front side of the clip 10 and also adapted for pulling the attachment portion 9 up at the rear side of the clip 10. The curved surfaces 13r, 14r are formed at the front end 17a of the clip body 17. Similar curved surface(s) may be formed at the rear end 17b of the clip body 17. Note that, compared with the clip 10 of FIG. 19, the clip 10 of FIGS. 1 to 3 may contribute to reduce an amount of raw material required for producing the clip 10 due to the above suggested separation line 76 in the molded article 7.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made.

What is claimed is:
1. A clip comprising:
   a clip body provided with an accommodating space extending in a front-rear direction; and
   left and right wings coupled to the clip body in a left-right direction orthogonal to the front-rear direction, each of the left and right wings including a front edge and a rear edge which extend away from the clip body along the left-right direction, wherein
   in one or both of the left and right wings, the front edge and the rear edge respectively slant linearly or non-linearly forward of the clip as extending away from the clip body, wherein at least one of the left and right wings is provided with at least one cutout that extends toward the clip body along the left-right direction and has an open end at a farther side from the clip body.

2. The clip according to claim 1, wherein the front edges of both left and right wings slant relative to the left-right direction.

3. The clip according to claim 2, wherein an angle between the left-right direction and the front edge is equal to or less than 45°.

4. The clip according to claim 1, wherein front and rear arms are arranged to sandwich the cutout, and the front and rear arms respectively slant forward of the clip as extending away from the clip body.

5. The clip according to claim 4, wherein widths of the front and rear arms in the front-rear direction are equal one another.

6. The clip according to claim 1, wherein each width of the left and right wings in the left-right direction is greater than a width of the clip body in the left-right direction.

7. The clip according to claim 6, wherein each width of the left and right wings in the left-right direction is greater than twice the width of the clip body in the left-right direction.

8. The clip according to claim 1, wherein the clip body comprises:
left and right walls which define the accommodating space; and
left and right nails which define an opening through which an attachment portion is introduced into the accommodating space, the left nail being coupled to the left wall and the right nail being coupled to the right wall, wherein
at least one of the left and right nails has a curved surface at a front end of the clip body, a width of the opening in the left-right direction being widened in accordance with the curved surface as the opening extends forward of the clip.

9. The clip according to claim 8, wherein the left and right walls extend in an up-down direction and have top and bottom ends in the up-down direction, the left and right wings being respectively coupled to the top or bottom ends of the left and right walls.

10. The clip according to claim 1, wherein in both of the left and right wings, the front edge and the rear edge respectively slant linearly or non-linearly forward of the clip as extending away from the clip body.

11. A clip comprising:
a clip body provided with an accommodating space extending in a front-rear direction; and
left and right wings coupled to the clip body in a left-right direction orthogonal to the front-rear direction, each of the left and right wings including a front edge and a rear edge which extend away from the clip body along the left-right direction, wherein
in both of the left and right wings, the front edge and the rear edge respectively slant linearly or non-linearly forward of the clip as extending away from the clip body, wherein
the front edges of both left and right wings slant linearly relative to the left-right direction, and the rear edges of both left and right wings slant linearly relative to the left-right direction, an angle between the left-right direction and the front edge being equal to an angle between the left-right direction and the rear edge.

12. A method of producing a clip, the method comprising:
producing a molded article through an extrusion molding, the molded article at least including: M (M indicates a natural number equal to or greater than 2) clip bodies each extending in an extruding direction; and N (N=M−1) intermediate portions each arranged between adjacent clip bodies in a width direction orthogonal to the extruding direction;
dividing the molded article at N first separation lines to obtain M individual pieces, the N first separation lines extending along the extruding direction and being set respectively in the N intermediate portions, and the first separation line being configured such that adjacent individual pieces have complementary shapes; and
dividing the individual piece at second separation lines orthogonal to an elongated direction of the individual piece so that clips are obtained from the individual piece, the second separation line being configured such that the clips having the same shapes are obtained from the individual piece, wherein the clip is configured in accordance with claim 11.

13. The method of producing a clip according to claim 12, wherein at least one of the left and right wings is provided with at least one cutout that extends toward the clip body along the left-right direction and has an open end at a farther side from the clip body.

14. The method of producing a clip according to claim 13, wherein front and rear arms are arranged to sandwich the cutout, and the front and rear arms slant forward of the clip correspondingly as extending away from the clip body.

15. The method of producing a clip according to claim 14, wherein the widths of the front and rear arms in the front-rear direction are equal.

16. The clip according to claim 11, wherein one or both of the left and right wings comprise front and rear arms respectively slant forward of the clip as extending away from the clip body to sandwich a cutout, a width of the cutout in the front-rear direction is constant in the left-right direction.

17. The method of producing a clip according to claim 12, wherein in both of the left and right wings, the front edge and the rear edge respectively slant linearly or non-linearly forward of the clip as extending away from the clip body.

18. The method of producing a clip according to claim 12, wherein the clip is configured symmetrically relative to a center plane of the clip, the clip having front and rear surfaces which extend linearly forward of the clip as extending away from the center plane of the clip.

19. A clip comprising:
a clip body provided with an accommodating space extending in a front-rear direction; and
left and right wings coupled to the clip body in a left-right direction orthogonal to the front-rear direction, each of the left and right wings including a front edge and a rear edge which extend away from the clip body along the left-right direction, wherein
in both of the left and right wings, the front edge and the rear edge respectively slant linearly or non-linearly forward of the clip as extending away from the clip body,
wherein
the clip is configured symmetrically relative to a center plane of the clip, the clip having front and rear surfaces which extend linearly forward of the clip as extending away from the center plane of the clip.

* * * * *

UNITED STATES PATENT AND TRADEMARK OFFICE
CERTIFICATE OF CORRECTION

PATENT NO. : 11,091,078 B2  
APPLICATION NO. : 16/568994  
DATED : August 17, 2021  
INVENTOR(S) : Zhiyu Ren et al.

Page 1 of 1

It is certified that error appears in the above-identified patent and that said Letters Patent is hereby corrected as shown below:

In the Specification

Column 1, Line 56, after "equal" insert -- to --.

Column 7, Line 57, delete "NOT" and insert -- not --, therefor.

In the Claims

Column 11, Line 17, in Claim 5, after "equal" insert -- to --.

Signed and Sealed this  
First Day of February, 2022

Drew Hirshfeld  
*Performing the Functions and Duties of the  
Under Secretary of Commerce for Intellectual Property and  
Director of the United States Patent and Trademark Office*

UNITED STATES PATENT AND TRADEMARK OFFICE
CERTIFICATE OF CORRECTION

| | |
|---|---|
| PATENT NO. | : 11,091,078 B2 |
| APPLICATION NO. | : 16/568994 |
| DATED | : August 17, 2021 |
| INVENTOR(S) | : Zhiyu Ren et al. |

It is certified that error appears in the above-identified patent and that said Letters Patent is hereby corrected as shown below:

On the Title Page

Item [73], delete "Corporation" and insert -- Corporation, Tokyo (JP) --, therefor.

Signed and Sealed this
Fourteenth Day of February, 2023

Katherine Kelly Vidal
*Director of the United States Patent and Trademark Office*